(12) United States Patent
Markowicz et al.

(10) Patent No.: US 10,550,875 B2
(45) Date of Patent: Feb. 4, 2020

(54) ADHESIVE ANCHOR

(71) Applicant: Dmarko Enterprises, LLC, Boca Raton, FL (US)

(72) Inventors: David J Markowicz, Boca Raton, FL (US); Bryan P Schofield, Nokomis, FL (US)

(73) Assignee: Dmarko Enterprises, LLC, Boca Raton, FL (US)

( * ) Notice: Subject to any disclaimer, the term of this patent is extended or adjusted under 35 U.S.C. 154(b) by 129 days.

(21) Appl. No.: 15/624,986

(22) Filed: Jun. 16, 2017

(65) Prior Publication Data

US 2017/0363137 A1 Dec. 21, 2017

Related U.S. Application Data

(60) Provisional application No. 62/350,786, filed on Jun. 16, 2016.

(51) Int. Cl.
*F16B 39/22* (2006.01)

(52) U.S. Cl.
CPC .................. *F16B 39/225* (2013.01)

(58) Field of Classification Search
CPC ....... F16B 13/144; F16B 39/225; F16B 39/22
USPC .................. 411/63, 80.5, 82, 82.3
See application file for complete search history.

(56) References Cited

U.S. PATENT DOCUMENTS

| | | | | |
|---|---|---|---|---|
| 2,092,341 A * | 9/1937 | De Vries | F16B 13/143 | 248/231.91 |
| 3,308,585 A * | 3/1967 | Fischer | F16B 13/141 | 222/386.5 |
| 3,485,132 A * | 12/1969 | Hanny | F16B 15/0092 | 29/458 |
| 3,702,060 A * | 11/1972 | Cumming | E21D 20/025 | 405/259.2 |
| 4,514,125 A * | 4/1985 | Stol | F16B 13/143 | 156/294 |
| 4,652,193 A * | 3/1987 | Hibbs | F16B 13/143 | 411/82.3 |
| 6,273,657 B1 * | 8/2001 | Vorona | F16B 13/00 | 411/180 |
| 6,896,462 B2 * | 5/2005 | Stevenson | F16B 13/002 | 411/1 |
| 8,814,486 B1 * | 8/2014 | Pryor | F16B 33/006 | 411/393 |
| 2005/0058521 A1 * | 3/2005 | Stevenson | F16B 13/002 | 411/82 |
| 2015/0308486 A1 * | 10/2015 | Ely | C09J 5/00 | 411/82 |

* cited by examiner

*Primary Examiner* — Roberta S Delisle
(74) *Attorney, Agent, or Firm* — Taylor English Duma LLP

(57) ABSTRACT

A method, process and machine to anchor objects to a surface using an encapsulated compound such as adhesive, expanding glue, hardening agent or other reactive and/or bonding substance intended for single use in a single anchor installation.

20 Claims, 7 Drawing Sheets

ADHESIVE ANCHOR

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims the benefit of and priority to U.S. Prov. Pat. Appl. No. 62/350,786 for Adhesive Anchor filed on Jun. 16, 2016 which is incorporated herein by reference in its entirety.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to an improved adhesive anchor and method of making and process of using the same.

Description of the Related Art

There exists in the art many forms of anchors for affixing various items to walls and other surfaces. The form of recommended anchor often varies depending on the composition of the surface be it drywall, wood, plaster, concrete, concrete block, brick, stone or other material. There are wedge anchors, sleeve anchors, drop-in anchors, lag screw shields, expansion anchors, machine screen anchors, toggle wing anchors, toggle bolt anchors, hammer drive anchors, and other classifications of anchors. Some anchors are conical. Other anchors are winged and/or ribbed. Anchors come in many shapes and sizes.

Anchors often enhance the durability and strength at which other fasteners, such as bolts, screws and nails adhere to a wall or other surface. Some anchors also enable nails, screws and bolts to be removed and reused while retaining grip in the underlying surface in which the fasteners are attached.

In heavy duty industrial applications an adhesive such as epoxy mortar may be used in concrete, masonry and rebar connections. After drilling a hole for an anchor this industrial adhesive is injected into hole before the anchor is placed. This requires proper measuring of the adhesive and the use of additional tools to inject adhesive into the anchor hole. It increases the time to install and complexity of installing the anchor and bolt and does not achieve desirable results when attaching to a surface of limited depth like drywall, concrete board, wooden board, metal sheet, acrylic or cinderblock.

Long desired is a simpler and lower cost method of increasing the stability of an anchor, particularly in dry wall applications where the anchor is intended for permanent or long term use.

BRIEF SUMMARY OF THE INVENTION

The invention provides a machine, method and process that solves these problems by delivering a premeasured amount of adhesive in a capsuled or chambered form that does not require measurement of the adhesive by the end user at site of installation. The use of the adhesive within the anchor enables the anchor and fastener both to be mechanically and chemically bonded to the surface. It creates an improved seal at the point of fastening and enables the use of an expanding adhesive to increase the bond on the backside of the surface where the anchor extends beyond the surface, such as into a hollow chamber like the reverse side of a drywall or concrete block.

Although the invention is illustrated and described herein as embodied in example adhesive anchor the invention is not limited to the details shown because various modifications and structural changes may be made without departing from the invention and the equivalents of the claims. However, the construction and method of operation of the invention together with additional objects and advantages thereof will be best understood from the following description of specific embodiments when read in connection with the accompanying drawings.

BRIEF DESCRIPTION OF THE DRAWINGS

Features and advantages of the present invention will become apparent to those skilled in the art from the following description with reference to the drawings, in which.

DETAILED DESCRIPTION OF THE INVENTION

Figure 1:
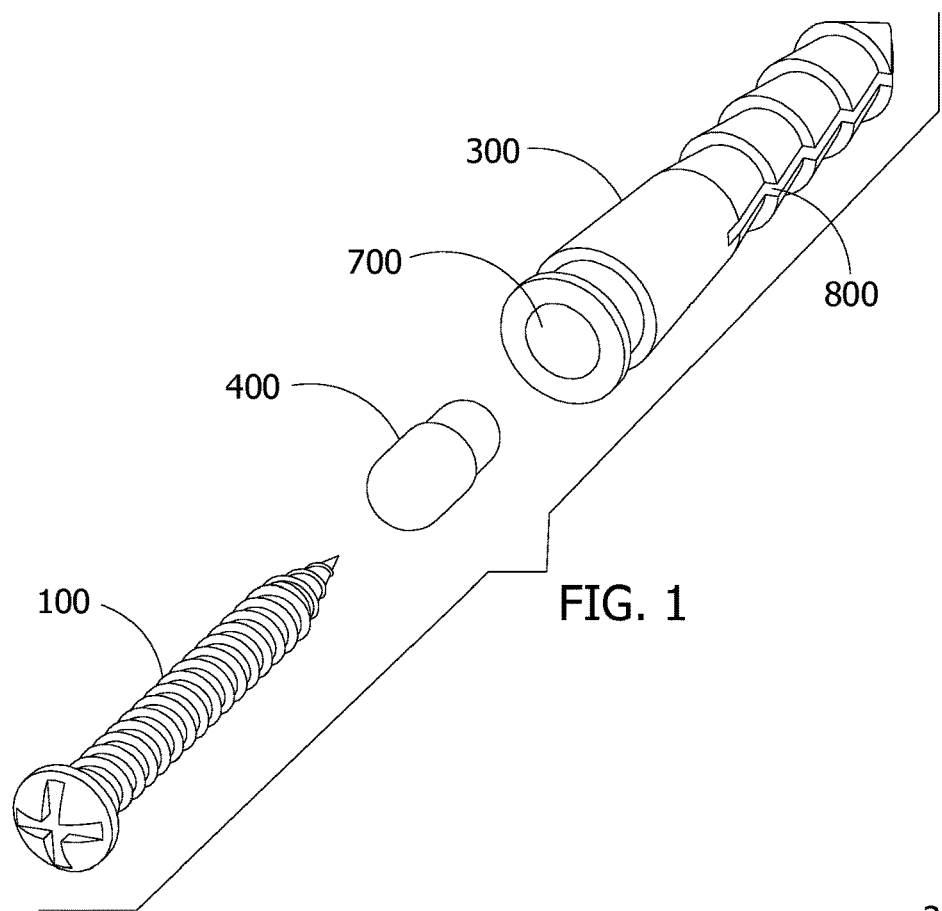
FIG. 1 depicts an exploded view of the instant invention.

Referring to the drawings, FIG. 1. depicts an exploded view of one embodiment of the instant invention. FIG. 1 comprises a screw 100, capsule 400, sleeve anchor 300 the chamber of the sleeve anchor 700 and a gap 800 separating the prongs of the sleeve anchor. Screw 100 may be replaced with a bolt, nail or other fastener used with an anchor for attaching, connecting and/or hanging another object to or from a surface. The fastener 100 is inserted into the receiving end of the sleeve anchor 300. Although the figure depicts a sleeve anchor, other anchors may be used, including but not limited to, for example: wedge; drop-in; lag screw; expansion; machine screen; toggle wing; toggle bolt; hammer drive; and, other anchors and their equivalents.

Figure 2:
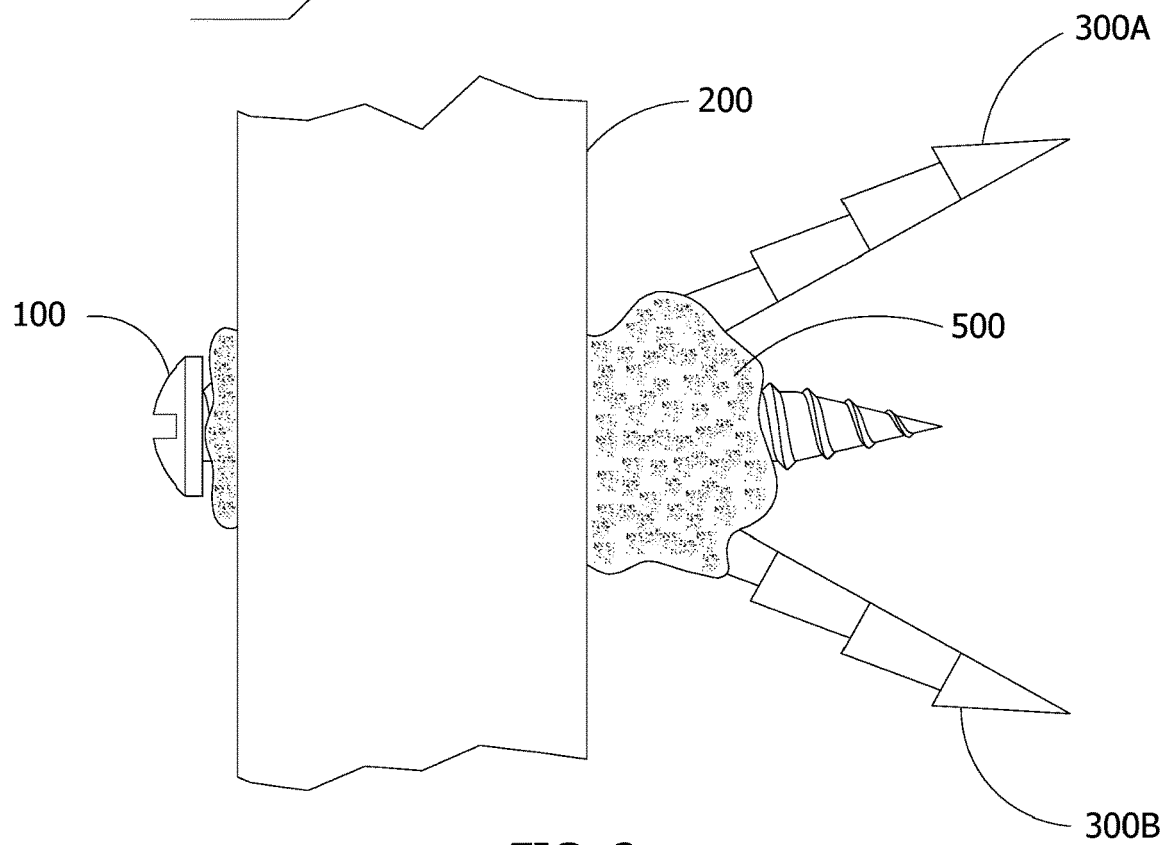
FIG. 2 depicts the instant invention of FIG. 1 installed in a surface.

FIG. 2. depicts the sleeve anchor 300 installed in a surface 200 where the capsule 400 of FIG. 1 has been pierced, crushed and/or destroyed to release and/or activate adhesive 500 in the wall and between the prongs 300A 300B of sleeve anchor 300. The prongs 300A 300B have expanded upon compression by screw 100 on the back (non-receiving) side of the surface 200. Capsule 400 enables a premeasured amount of adhesive 500 sufficient and appropriate for reducing and/or preventing movement of the screw 100 in the anchor 300 and/or the anchor in the surface 200. The adhesive 500 may be any type of adhesive suitable for achieving the objects of the invention. However, it is preferred to use an expanding adhesive that increases in volume once the capsule has been crushed, pierced or destroyed as depicted in FIG. 2. This creates an additional bond on the back (non-receiving) side of the surface. In some applications it is also desirable to have the adhesive bond the fastener and or anchor on the front (receiving) side of the surface.

The adhesive 500 may be enclosed in a single capsule as depicted, but other containers such as gel caps, sealants, may be used singularly, in multitude, or with other devices to enable a multipart adhesive solution and/or epoxy to mix. Also, the anchor may contain and/or directly integrate one or more crushable or piercable containers within chamber 700.

The inventors have found that polyeurothane adhesives, including those containing diphenylmethane diisocyanate, isomers and homologues are particularly well suited as adhesive 500 for drywall applications. However, any adhesive or expanding and solidifying product may be used as the adhesive 500. The inventors have found that when commercially available diphenylmethane diisocyanate, isomers and homologues are used, medical gelatin capsules in sizes 00-4 (0.981, 0.68, 0.5, 0.37, 0.3, and 0.21 ml size) are sufficient for use as the capsule 400 in most common applications such as for affixing towel bars and wall shelves.

The recommended size of the capsule 400 varies depending on the application, size of anchor, and adhesive used. Other containers are suitable for substitution as the capsule 400 while still falling within the scope of the invention. The composition of the capsule 400 or other container will vary depending on the adhesive and intended application. For best results, the adhesive used will vary depending on the intended application. Factors effecting selection of adhesive include surface material, temperature, moisture, cure time, bond strength and desired amount of expansion.

Figure 3:
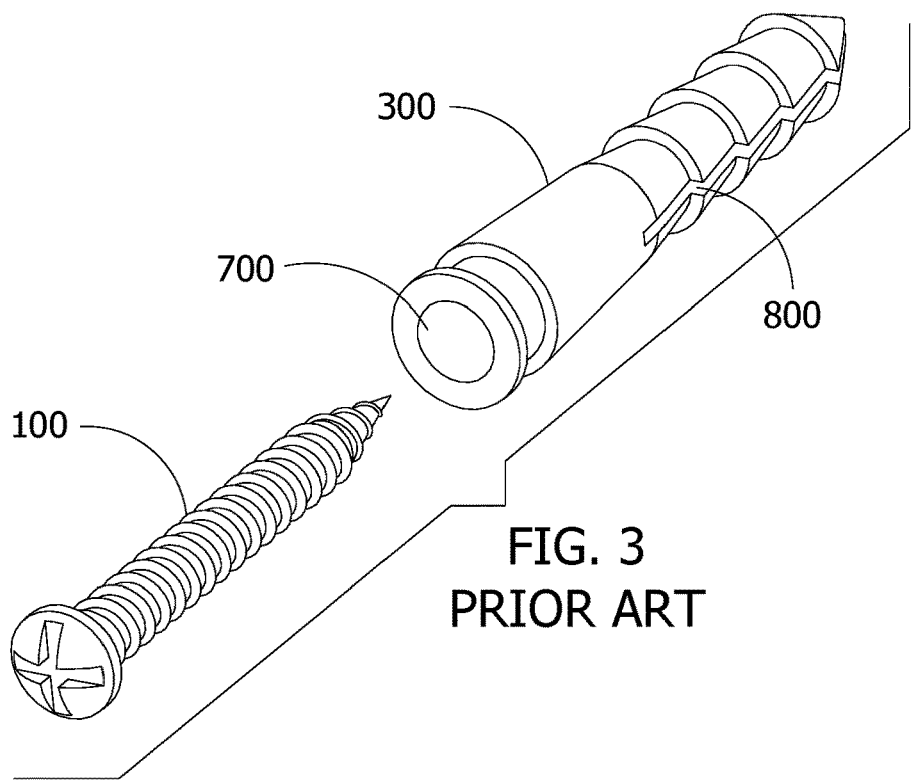
FIG. 3 depicts an exploded view of a prior art sleeve anchor.
Figure 4:
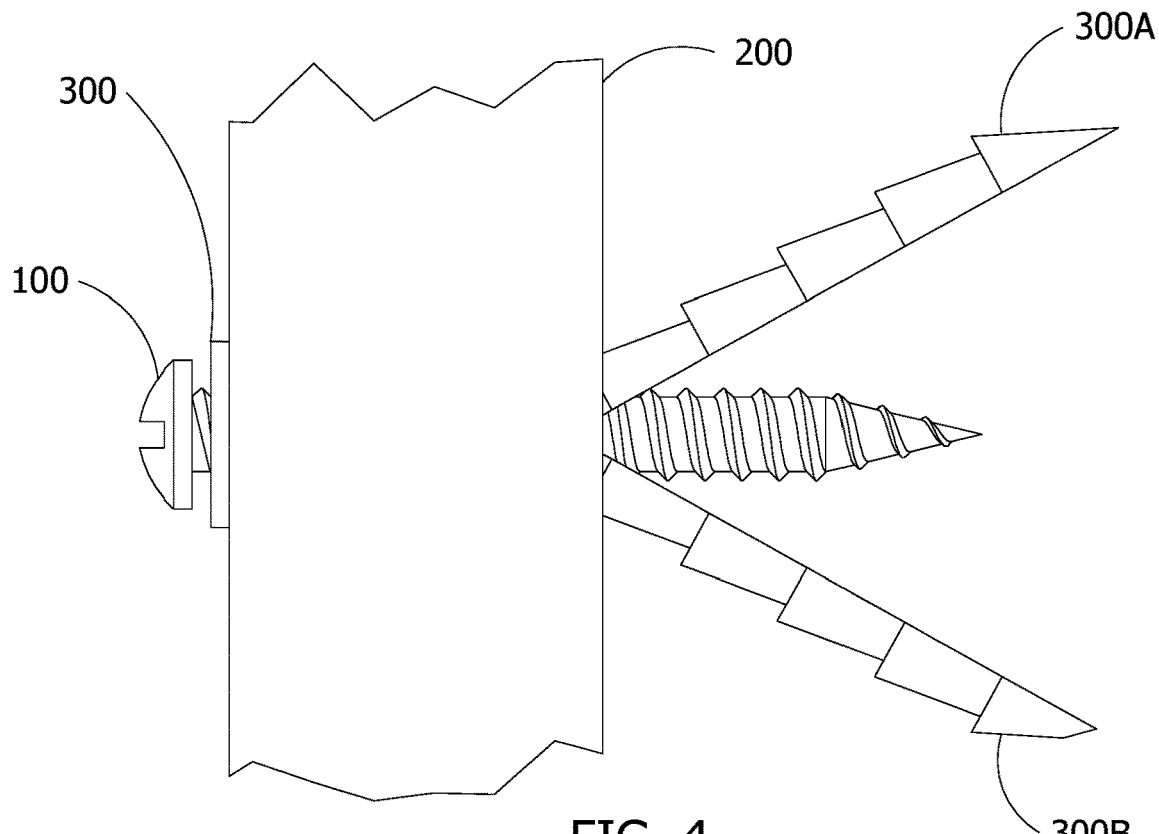
FIG. 4 depicts the prior art sleeve anchor of FIG. 3 installed in a surface.

FIGS. 3 and 4 depict a prior art screw 100, and anchor 300 installed in a surface 200.

Figure 5:
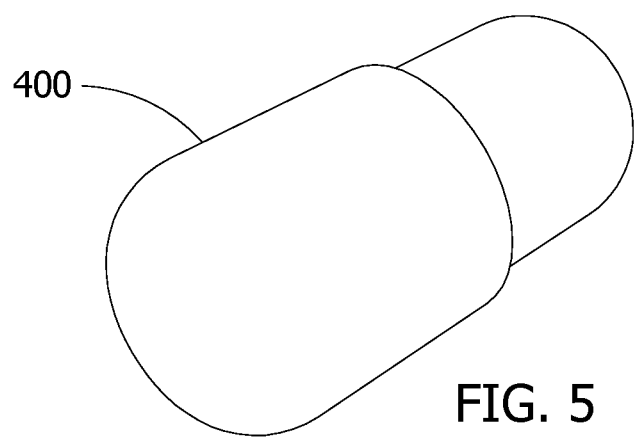
FIG. 5 depicts a close up of capsule of the instant invention.
Figure 6:
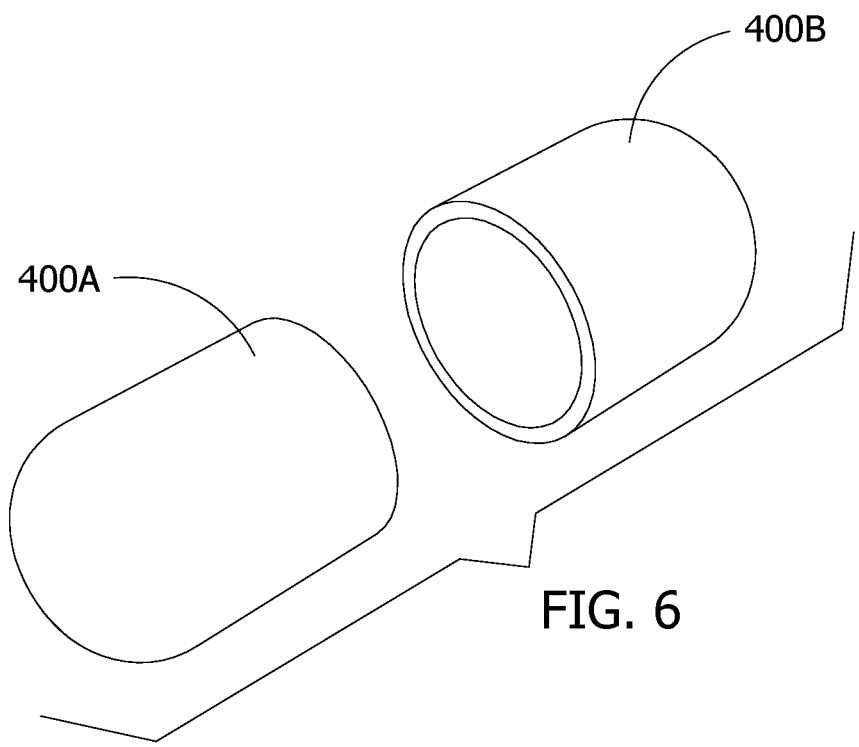
FIG. 6 depicts an exploded view of the capsule of the instant invention.
Figure 7:
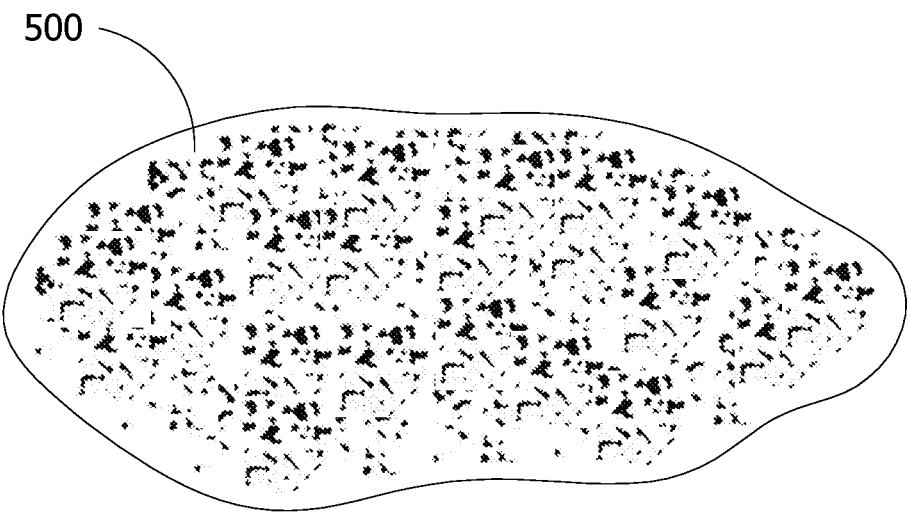
FIG. 7 depicts an the adhesive contained in the capsule of the instant invention.
Figure 8:
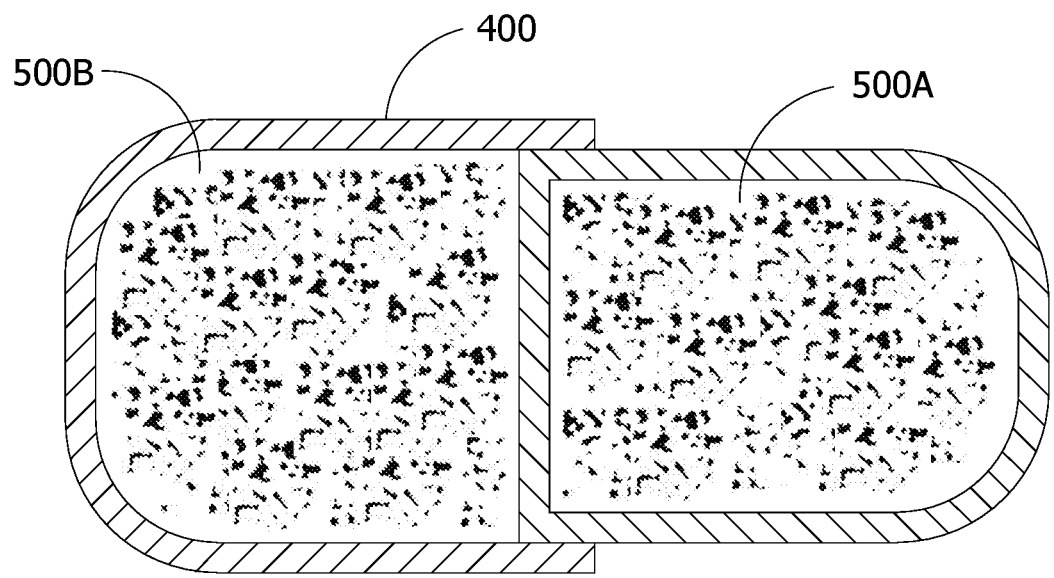
FIG. 8 depicts a cut away of a bi-partitioned capsule of the instant invention.

FIG. 5 shows a close up of the capsule 400 of FIG. 1. In FIG. 6 the capsule 400 is exploded showing its inner chamber. FIG. 7 shows an example of an adhesive contained inside the capsule 400 of FIGS. 1 and 5. FIG. 8 shows a cut away of a capsule 400 that is partitioned into two chambers. One chamber contains adhesive component 500A and in the other chamber contains component 500B. Although FIG. 8 depicts a bi-chambered capsule, there may be any amount of chambers depending on the size of the capsule to enable the mixing and/or use of multipart solutions at the time and site of installation. Any size of capsule or chamber may be used provided it fits within the anchor or the hole drilled for the anchor. Although the drawings show the capsule inserted into the anchor, in applications where the anchor does not pierce the backside of the surface, the capsule can be placed into a drilled hole before inserting the anchor. In such cases, the capsule may be crushed/pierced and adhesive thereby activated by insertion and/or expansion of the anchor.

Figure 9:
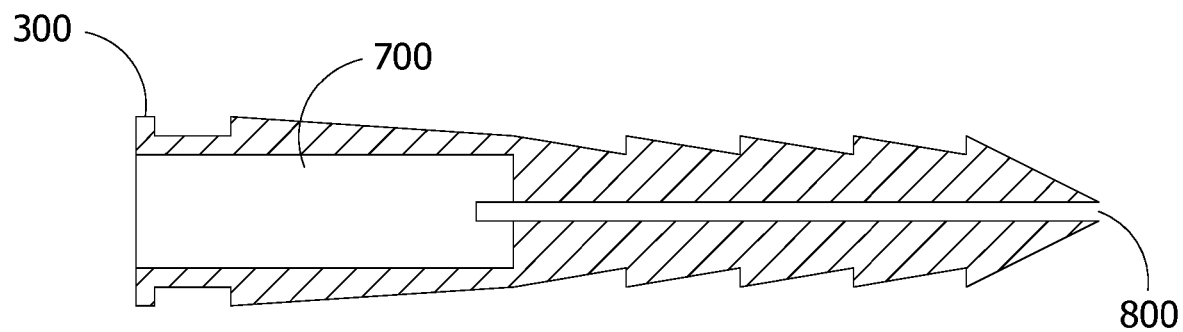
FIG. 9 depicts a sleeve anchor embodiment of the instant invention.
Figure 10:
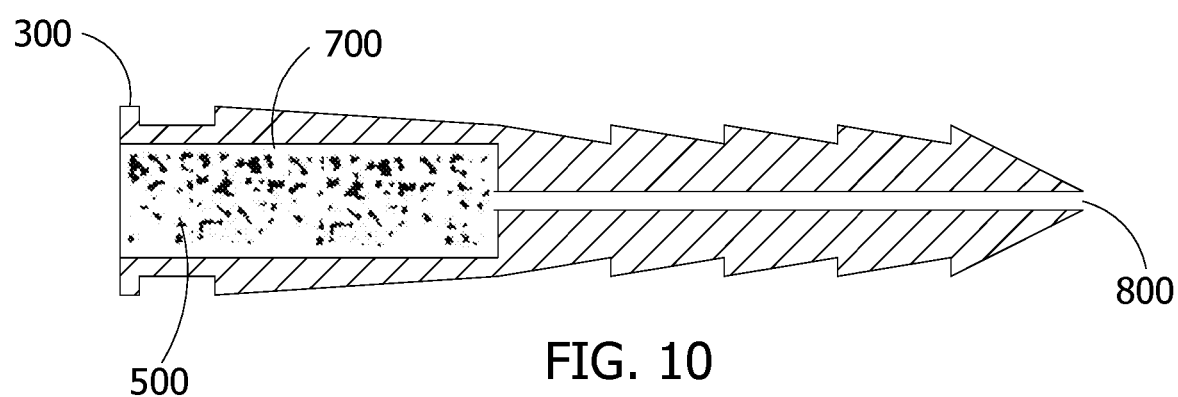
FIG. 10 depicts a sleeve anchor embodiment of the instant invention where the capsule is integrated into a chamber of the sleeve anchor.
Figure 11:
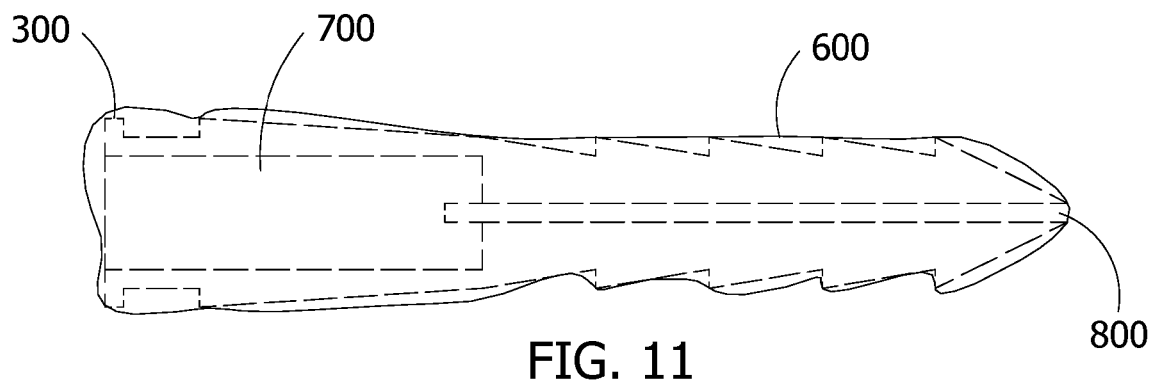
FIG. 11 depicts a sleeve anchor embodiment of the instant invention where the sleeve anchor is enclosed in an outer seal.

FIG. 9 shows a cutaway example of sleeve anchor 300 with chamber 700 and prong gap 800. The chamber 700 of sleeve anchor 300 may accommodate capsule 400. FIG. 10 shows an alternative embodiment of the instant invention where the chamber 700 replaces capsule 400 and contains adhesive 500 in an integrated sealed chamber. FIG. 11 shows yet another embodiment of the invention where the entire sleeve anchor is sealed with an outer layer 600.

Figure 12:
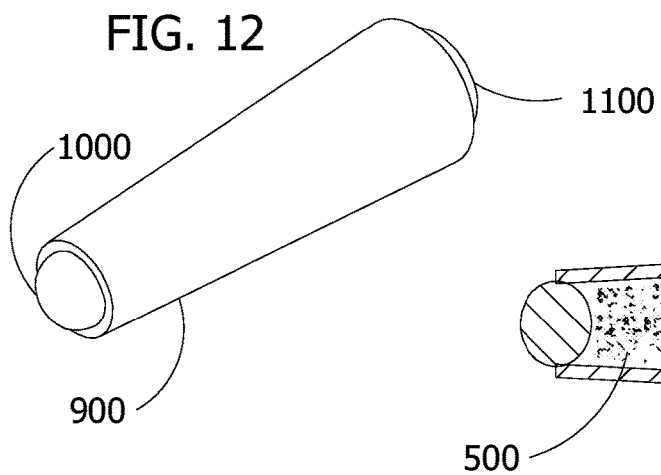
FIG. 12 depicts an improvement to the capsule of the instant invention.

FIG. 12 shows an improved capsule 900 that substitutes for capsule 400. The improved capsule if formed to snuggly fit the interior of the anchor 300. The ends 1000 and 1100 of the improved capsule may be formed from an adhesive or fast drying substance. It is preferred that the ends 1000 and 1000 are of similar composition to the encapsulated compound 500 after it has hardened as depicted in FIG. 2. This improves the effect and integration of the capsule into the product depicted in FIG. 2. It is also desirable to use a similar integrating material to form the capsule 900. The improved capsule of FIG. 12 may also be formed as part or directly integrated within an anchor. The ends 1000 and 1100 of the capsule may bulge, be rounded, flat or of other forms.

Figure 13:
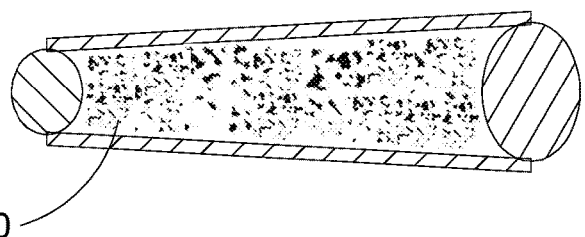
FIG. 13 depicts a cross section of an improvement to the capsule of the instant invention.

FIG. 13 shows a cutaway of the improved capsule 900 that substitutes for capsule 400 and contains an adhesive, expanding or hardening substance 500. In many applications the substance 500 generally expands, adheres and/or hardens upon contact with air, but some applications may require a substance that expands or hardens when exposed to water or other chemicals. The appropriate chemical mixture should be used for the specific application.

Figure 14:
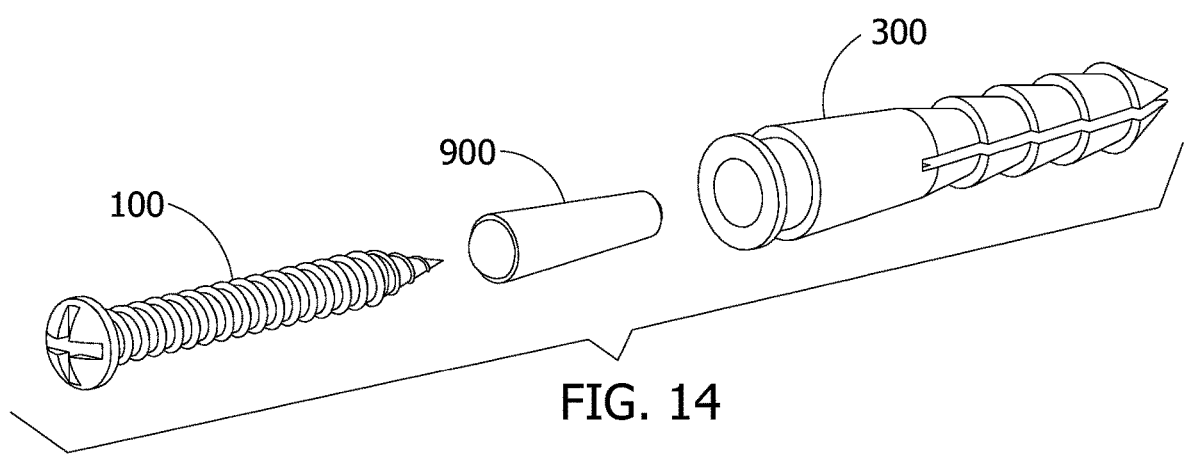
FIG. 14 depicts an exploded view of the instant invention using the improved capsule.

FIG. 14 shows an exploded view of the improved capsule 900 conforming with the interior of an anchor 300. The shape and form of capsule 900 may vary. By conforming with the specific anchor it enables more substance 500 to be used and for more efficient packaging and distribution to the market. It also enables more uniform distribution of the substance 500 when the screw 100 is pierces/shreds the capsule 900.

Figure 15:
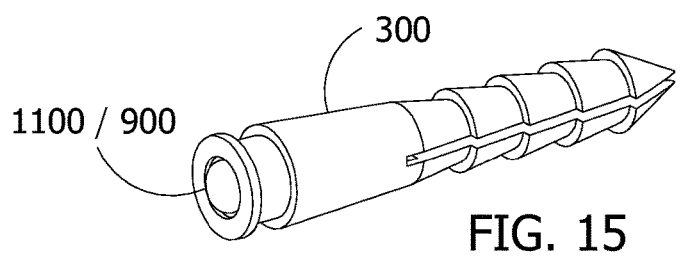
FIG. 15 show the improved capsule inserted into an anchor.

FIG. 15 shows an improved capsule 900 inserted and conforming with the interior of an anchor 300. The improved capsule 900 may actually be formed as the anchor 300 and then sealed with end 1100. This maximizes the amount of substance 500 that is used with the anchor, but does not enable the capsule or adhesive to be separated or substituted from the anchor, which is desirable in some applications. For example, overtime compounds 500 used in the capsules may harden or degrade whereas the anchor 300 may be more durable. Separating the capsule from the anchor enables different applications and also enables multiple capsules to be used with one anchor. For instance capsule 900 may be segmented into two or more parts each containing separate compound components to have an effect similar to the capsule in FIG. 8. and adhesive components 500A and 500B. Expanding, hardening and temperature changing compounds may be substituted for the adhesives 500, 500A, 500B, etc. depending on the application and desired result. The compound 500 used may have many components that alter the reaction or application once the screw 100 pierces, crushes, shreds or interacts with the capsule 400, 900, etc.

Figure 16:
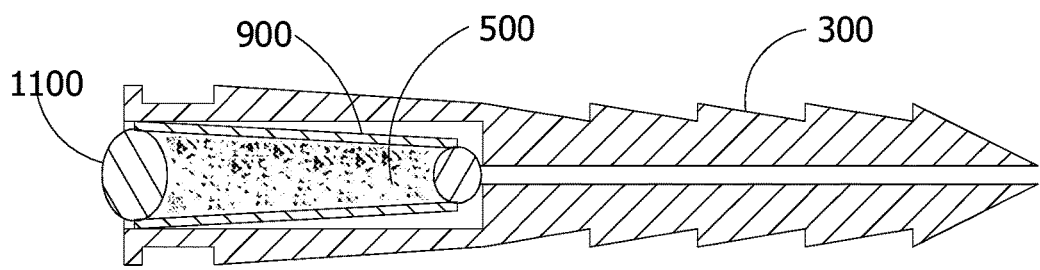
FIG. 16 depicts a cross section of an anchor containing an improved capsule.
Figure 17:
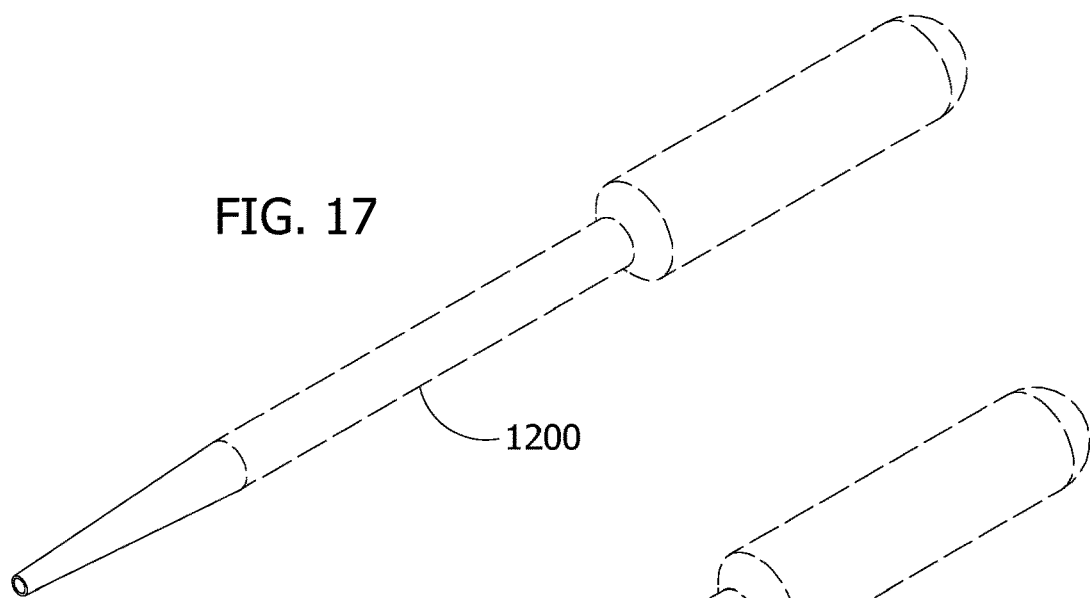
FIG. 17 depicts a pipet to be used to create an improved capsule.

FIG. 16 shows a cut away of the improved capsule as it is used within an anchor 300.

Figure 18:
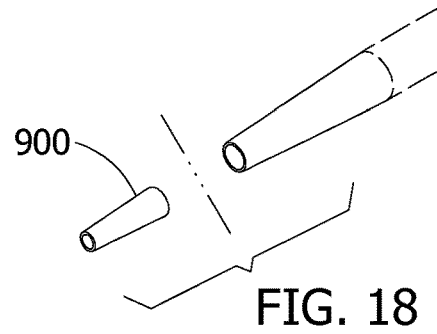
FIG. 18 depicts a cutaway of pipet used to create an improved capsule.
Figure 19:
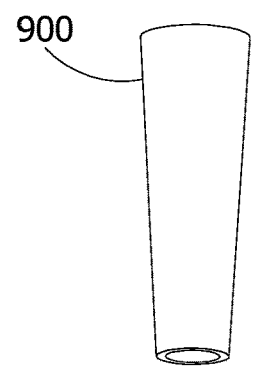
FIG. 19 depicts the cut portion of a tubing such as the pipet in FIG. 18 used to create an improved capsule.
Figure 20:
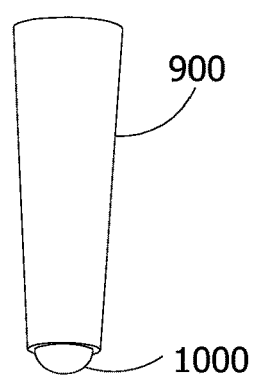
FIG. 20 depicts an end cap on the cut portion of a tubing used to create an improved capsule.
Figure 21:
FIG. 21 depicts the filing of the tube portion with an adhesive and/or expanding compound.
Figure 22:
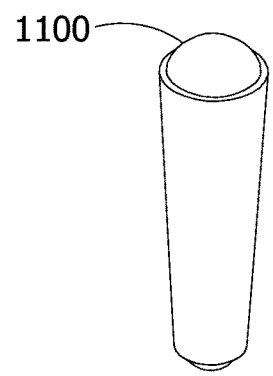
FIG. 22 depicts a fully sealed tube portion that embodies improvements to the capsule of the instant invention.

FIGS. 17 through 22 illustrate how a common pipet may be used to create an improved capsule by cutting the end piece to form the capsule body 900. First, as shown in FIG. 18 the pipet or tubing 1200 is cut to form capsule body 900. Then, as shown FIG. 20, capsule body 900 is sealed at one end 1000. Then, as further shown in FIG. 21 a substance 500 is added to the capsule 900 before it is sealed in FIG. 22 with at the other end 1100. In another method of manufacture, a long tubing is used. In one form of this alternative method the tubing is preformed to repeat the anchor conforming shape (e.g. 900) so that it may later be cut or burned/melted between the anchor conforming shapes/segments. The long tubing is completely filled with substance 500 before it is cut, melted or burned in to substantially uniform segments. The segments of the long tubing are then sealed either through the cutting, melting or burning or alternatively through exposure to a chemical, light or liquid that seals the ends to create capsules like those in 900 or another shape that is insert able into an anchor.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. An anchor system comprising:
a fastener rod defining a rod axis;
an anchor comprising a plurality of prongs configured to radially expand with respect to the rod axis as the fastener rod is inserted into the anchor;
an encapsulated substance;
wherein the encapsulated substance is held within one or more of the following:
a sealed chamber of the anchor; and
a capsule configured to insert into the anchor;
and wherein the encapsulated substance is released during insertion of the fastener rod into the anchor.

2. The anchor system of claim 1 wherein the encapsulated substance is an adhesive.

3. The anchor system of claim 1 wherein the encapsulated substance is expanding.

4. The anchor system of claim 1 wherein the encapsulated substance is an expanding adhesive.

5. The anchor system of claim 4 wherein the fastener rod is a screw and the encapsulated substance is held within the capsule.

6. The anchor system of claim 5 wherein the anchor is a sleeve anchor.

7. The anchor system of claim 6 wherein the encapsulated substance further comprises polyurethane.

8. The anchor system of claim 7 wherein the encapsulated substance hardens after exposure to air.

9. The anchor system of claim 1 wherein the fastener rod is a screw.

10. The anchor system of claim 1, wherein the encapsulated substance is held within the capsule, and wherein the capsule is configured to removably insert into the anchor.

11. The anchor system of claim 1, wherein:
the encapsulated substance is held within the capsule;
the fastener rod comprises a point, the point configured to puncture the capsule as the point enters the capsule and to puncture the capsule again as the point exits the capsule.

12. The anchor system of claim 1, wherein:
the anchor is configured to be inserted through a front side of a surface and to extend out a back side of the surface; and
the encapsulated substance is configured to be released to the back side of the surface.

13. The anchor system of claim 12, wherein:
the encapsulated substance is an expanding adhesive; and
the adhesive is configured to expand to adhere the anchor to the front side of the surface, to adhere the anchor to the back side of the surface, and to adhere the fastener rod to the anchor.

14. The anchor system of claim 1, wherein:
the encapsulated substance comprises two components, the substance configured to harden when the two components mix; and
the chamber or capsule defines at least two compartments, each compartment holding a respective one of the two components.

15. The anchor system of claim 1, wherein:
the plurality of prongs define at least one gap therebetween; and
the encapsulated substance is configured to be released within the gap.

16. The anchor system of claim 15, wherein:
the anchor further comprises an insertion end configured to receive the fastener rod, and a prong end opposite the insertion end;
the anchor defines a chamber, the chamber being the sealed chamber or an unsealed chamber; and
the gap extends from the chamber to the prong end.

17. The anchor system of claim 1, wherein:
the encapsulated substance is held within the capsule;
the anchor defines an unsealed chamber; and
the capsule is positioned within the chamber.

18. The anchor system of claim 17, wherein:
the capsule comprises a covering portion and a covered portion; and
the covered portion is inserted into the chamber first.

19. The anchor system of claim 17, wherein a shell of the capsule is a hardened form of the encapsulated substance.

20. The anchor system of claim 17, wherein:
an exterior of the capsule substantially conforms to an interior of the chamber.

\* \* \* \* \*